United States Patent
Bujanos et al.

(10) Patent No.: US 9,485,021 B2
(45) Date of Patent: Nov. 1, 2016

(54) HYBRID LASER ANTI-CLIPPING FOR FIBER-COAXIAL NETWORKS

(71) Applicant: ARRIS Enterprises, Inc., Suwanee, GA (US)

(72) Inventors: Joaquin Beas Bujanos, Nuevo Leon (MX); Sergio Alfredo Mendoza Aguirre, Nuevo Leon (MX)

(73) Assignee: ARRIS Enterprises, Inc., Suwanee, GA (US)

(*) Notice: Subject to any disclaimer, the term of this patent is extended or adjusted under 35 U.S.C. 154(b) by 0 days.

(21) Appl. No.: 14/340,968

(22) Filed: Jul. 25, 2014

(65) Prior Publication Data

US 2016/0028482 A1 Jan. 28, 2016

(51) Int. Cl.
*H04B 10/04* (2006.01)
*H04B 10/12* (2006.01)
*H04B 10/2575* (2013.01)
*H04B 10/58* (2013.01)
*H04B 10/079* (2013.01)
*H04B 10/508* (2013.01)
*H04B 10/50* (2013.01)

(52) U.S. Cl.
CPC .... *H04B 10/2575* (2013.01); *H04B 10/07955* (2013.01); *H04B 10/25751* (2013.01); *H04B 10/508* (2013.01); *H04B 10/58* (2013.01); *H04B 10/504* (2013.01)

(58) Field of Classification Search
CPC .............................................. H04B 10/25751
See application file for complete search history.

(56) References Cited

U.S. PATENT DOCUMENTS

| 5,181,453 A | 1/1993 | Kayukawa et al. |
| 5,245,229 A | 9/1993 | Colvin, Sr. |

(Continued)

FOREIGN PATENT DOCUMENTS

| WO | 00/36777 A1 | 6/2000 |
| WO | 03/005614 A2 | 1/2003 |
| WO | WO 03005614 A2 * | 1/2003 |

OTHER PUBLICATIONS

PCT Search Report & Written Opinion, RE: Application No. PCT/US2015/041974, dated Oct. 26, 2015.

(Continued)

*Primary Examiner* — Ken N Vanderpuye
*Assistant Examiner* — Jai Lee
(74) *Attorney, Agent, or Firm* — Lori Anne D. Swanson

(57) ABSTRACT

Systems, devices, and methods for hybrid anti-clipping in optical links in hybrid fiber-coaxial (HFC) networks are disclosed. A hybrid anti-clipping circuit can be included in both the uplink and downlink paths of the HFC network to avoid driving the laser in the optical link above a clipping threshold. The anti-clipping circuit can compare the average, or RMS, input power level and the power envelope of a RF input signal to a clipping threshold associated with the particular laser module being used. If the average power is above the clipping threshold, then the input signal can be attenuated proportionally to avoid clipping. If peaks in the power envelope are above the clipping threshold, then the bias current of the laser module can be adjusted to avoid clipping. Accordingly, the modes of anti-clipping circuit operation include applying attenuation to the input signal and/or adjusting the laser module bias current.

20 Claims, 7 Drawing Sheets

(56) References Cited

U.S. PATENT DOCUMENTS

| | | | |
|---|---|---|---|
| 5,689,356 A | 11/1997 | Rainal | |
| 6,211,984 B1 | 4/2001 | Yoshida | |
| 6,549,316 B2 | 4/2003 | Blauvelt | |
| 6,728,277 B1 | 4/2004 | Wilson | |
| 7,573,923 B2 | 8/2009 | Zheng | |
| 7,813,653 B2 | 10/2010 | Vieira et al. | |
| 8,165,474 B2 | 4/2012 | Zheng et al. | |
| 8,165,475 B2* | 4/2012 | Zheng | H04B 10/504 372/38.1 |
| 8,320,773 B2* | 11/2012 | Zheng | H04B 10/2575 398/194 |
| 2004/0100325 A1* | 5/2004 | van Amerom | H03G 3/3042 330/144 |
| 2008/0292315 A1 | 11/2008 | Zhou et al. | |
| 2009/0041474 A1* | 2/2009 | Ishaug | H04B 10/504 398/193 |
| 2009/0237171 A1* | 9/2009 | Zheng | H04B 10/25751 332/151 |
| 2010/0033246 A1* | 2/2010 | Draxler | H03F 1/3247 330/149 |
| 2010/0086309 A1 | 4/2010 | Zheng et al. | |
| 2013/0051789 A1* | 2/2013 | Shih | H04B 10/40 398/16 |
| 2013/0094802 A1* | 4/2013 | Azadeh | H01S 5/042 385/15 |
| 2015/0304041 A1* | 10/2015 | Schemmann | H04B 10/25751 398/72 |
| 2015/0304064 A1* | 10/2015 | Mutalik | H04J 14/0221 398/48 |

OTHER PUBLICATIONS

Howald, Robert, et al., "Noise Power Ratio the Analytical Way". Motorola Broadband Communications Sector.

SCTE Engineering Committee Interface Practices Subcommittee, "Measurement Procedure for Noise Power Ratio", Society of Cable Telecommunications Engineers, Inc. 2011.

Rafał Królikowski, "HFC network return path performance modeling". PrzeglĄpd Elektrotechniczny (Electrical Review), ISSN 0033-2097, R. 87 NR Aug. 2011.

Dabke, K.P., et al., "Expert system for the design of optical fibre communications links". Optical Fiber Communications. vol. 8, No. 3, pp. 319-331, 1995.

Lai, Stephen, et al., "Theoretical and Experimental Analysis of Clipping-Induced Impulsive Noise in AM SB Subcarrier Multiplexed Lightwave Systems". Journal of Lightwave Technology. vol. 15, No. 1, pp. 20-30, Jan. 1997.

Ho, Keang-Po et al., "Optimal Predistortion of Gaussian Inputs for Clipping Channels". vol. 44, No. 11, pp. 1505-1513, Nov. 1996.

Tsushima, H. et al., "Pre-clipping experiment for subcarrier multiplexed AM/64QAM optical transmission". vol. 31, No. 21, pp. 1863-1865, Oct. 1995.

Pophillat, L "Optical Modulation Depth Improvement in SCM Lightwave Systems Using a Dissymmetrization Scheme". IEEE Photonics Technology Letters. vol. 6 No. 6, pp. 750-753, Jun. 1994.

* cited by examiner

HYBRID LASER ANTI-CLIPPING FOR FIBER-COAXIAL NETWORKS

BACKGROUND

Hybrid fiber-coaxial (HFC) networks include both fiber optic and coaxial connections and are commonly used to provide broadband data and video services. For example, HFC networks offer broadcast video, interactive television, digital video, high-speed data and Internet access, and telephony services. In a typical implementation, HFC networks deliver such broadband data services as optical signals transmitted from head-end locations via an optical fiber to an optical distribution node. On the downlink side (i.e., head-end location-to-subscriber direction), the optical distribution node converts the optical signals to radio frequency (RF) signals and transmits the RF signals to subscriber locations via coaxial cable links. Some HFC networks allow for two-way communication. Such two-way HFC networks usually include an uplink (i.e., subscriber-to-head-end location direction) communication connection, through which subscriber premises devices transmit RF signals to the optical distribution node that then converts the RF signals to optical signals for transmission back to the head-end location.

The RF signals in an HFC network are typically transmitted in the 5 MHz to 1.8 GHz range. In some implementations, the frequency spectrum from 85 MHz to 1 GHz is used by the optical distribution node for downlink signals, while the frequency spectrum from 5 to 85 MHz is used by the subscriber premises devices for uplink signals. However, the actual split of the spectral band can vary by the standard used. Using such configurations, an HFC network can provide adequate two-way services for interactive services, such as Internet access, e-mail, voice/telephone services, or video on demand. However, the two-way services provided by existing HFC networks are often limited by the bandwidth asymmetry in the downlink and uplink frequency spectra. As new two-way applications and services become more popular, the demand for HFC networks to provide symmetric high-quality high-bandwidth services also increases. Interactive video, interactive gaming, video telephony, videoconferencing, remote storage, virtual DVD, and high-speed virtual private networks (VPNs) are just a few such applications for existing two-way HFC networks may be inadequate. Increases in uplink, or so-called "return path," traffic have exposed limitations in the current HFC networks. In some implementations, the optical link devices required to convert the RF uplink signals to optical signals are the limiting factor.

In many HFC networks, the return path signal is converted from the electrical domain to the optical domain in the optical distribution node using a directly modulated semiconductor laser, such as diode laser. The simplicity of such implementations comes at the cost of very stringent noise and distortion requirements on the laser. More complex, and consequently more expensive, distributed feedback (DFB) lasers have been proven to meet the voice and distortion requirements. While the additional cost associated with DFB lasers can sometimes be justified in implementations in which extremely large populations of end users are served, such lasers still have limitations. While the channel capacity of DFB lasers is large, such devices are still inherently limited by the physical characteristics of the semiconductor laser. If the product of the number of channels and modulation depth per channel exceeds the threshold current of the laser, the modulation current will drop below the laser threshold current and shut off the laser. For example, if the RF input signal power to the laser goes beyond an inherent or characteristic limit, then signal distortion increases rapidly. Also, if RF input signal power goes substantially above that limit, distortion known as "laser clipping" occurs.

Laser clipping occurs when the modulating RF input signal current that drives the semiconductor laser, in either the uplink or downlink directions, occasionally falls below the laser's threshold current resulting in nearly zero optical power output. This behavior degrades the Bit Error Rate (BER) performance of the transmitted digital signal.

DETAILED DESCRIPTION

Described herein are techniques for systems, methods, and devices for improving the RF input power dynamic range of optical transmitters in hybrid fiber-coaxial (HFC) networks using configurable hybrid anti-clipping circuits with automatic RF gain and laser bias current controls. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Hybrid Fiber-Coaxial Networks

Figure 1:
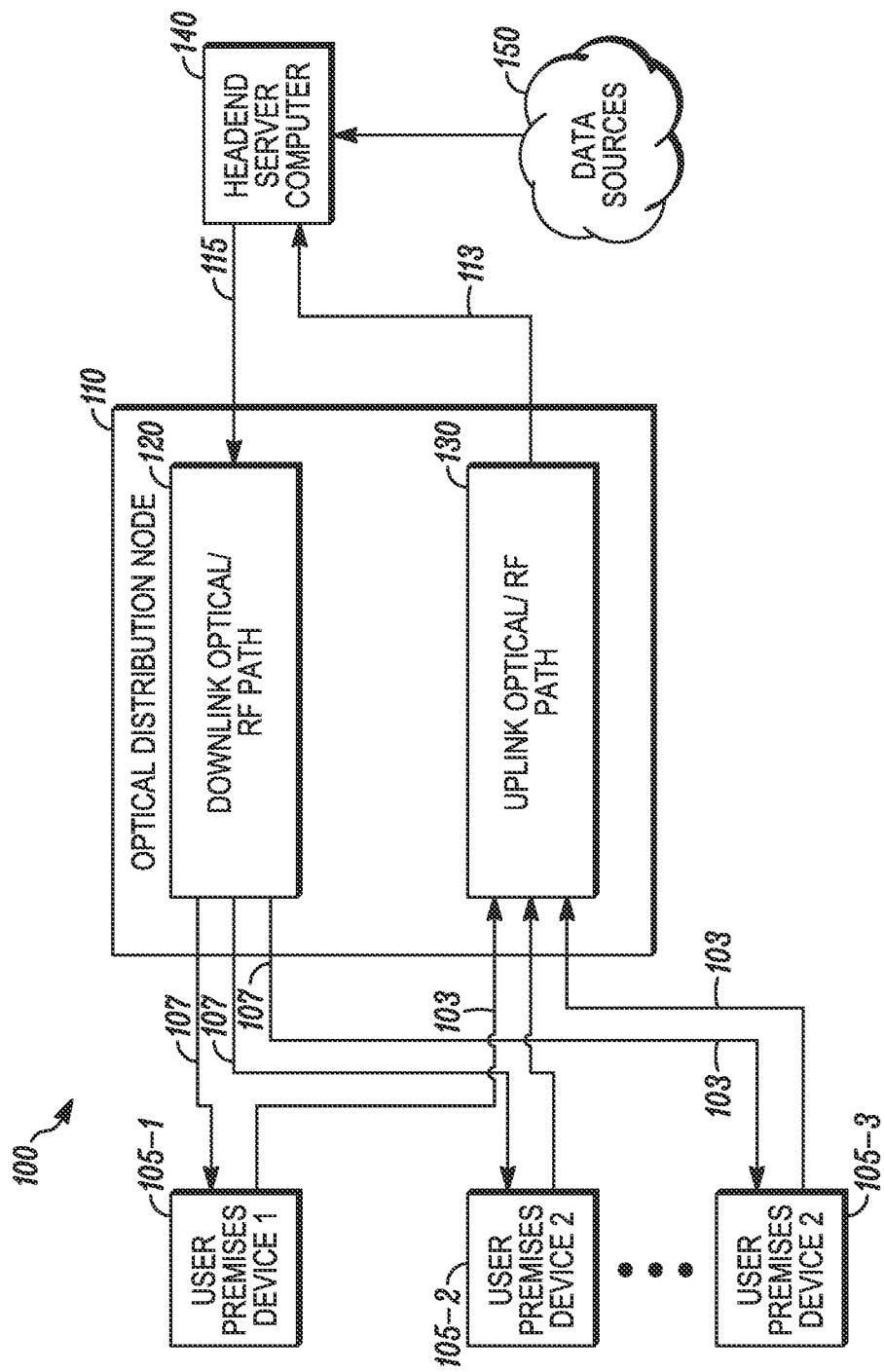
FIG. 1 is a schematic diagram of a two-way hybrid fiber-coaxial (HFC) network, according to embodiments of the present disclosure.

FIG. 1 is a schematic diagram of an example two-way HFC network 100. As shown, the HFC network 100 includes a number of user premises devices 105, (e.g., cable modems and set-top-boxes), an optical distribution node 110, and a head-end server computer 140. The user premises devices 105 and the head-end server computer 140 can exchange signals through corresponding hybrid RF-optical paths in the optical distribution node 110. In such embodiments, the terms "downstream" and "downlink" refer to the RF-optical path 120 through which data signals are transmitted from the head-end server computer 140 to the user premises devices 105. Similarly, the terms "upstream" and "uplink" refer to the RF-optical paths 130 through which data signals are transmitted from the user premises devices 105 to the head-end server computer 140. Such systems are often limited by various electrical/optical characteristics, and in particular the laser clipping characteristics, of the optical link devices in the optical distribution node 110 and the head-end server computer that convert RF electrical signals to optical signals. Accordingly, improvements provided by various embodiments of anti-clipping systems, methods, and circuits described herein can be implemented in and realized by either the downlink path 120 or the uplink path 130.

The basic functionality of example HFC network 100 is described in reference to FIG. 100 to provide context as to how various aspects of the present disclosure can improve overall system performance. In various embodiments, the head-end server computer 140 receives data signals from data sources 150 (e.g., satellite feeds from television stations, data from websites on the Internet, music from online services, etc.). The data signals can include any type of information, such as video data, voice data, music data, and the like. The head-end computer system 140 can process and/or transcode the data signals before generating and transmitting corresponding optical data signals over one or more fiber optic connections 115 to optical distribution node 110. When the optical signals are received by the optical distribution node 110, the signals can be converted from the optical domain (e.g., optical frequencies and protocols) to the electrical domain (e.g., RF signals and protocols) in the downstream optical/RF path 120. In some embodiments, the downstream optical/RF path 120 can include routing functionality for routing the resulting RF signals to one or more user premises devices 105 over corresponding electrical connections 107 (e.g., coaxial cables). In two-way communication capable HFC network 100, the user premises devices 105 can generate RF signals (e.g., requests for data or voice data) and transmit them to the optical distribution node 110. In the upstream RF/optical path 130, the RF signals are converted from the electrical domain to the optical domain. Conversion of the signals from the electrical domain to the optical domain includes the use of optical transmitter (e.g., a semiconductor laser module) that can be driven by the electrical signals to generate corresponding optical signals (e.g., modulated signals of light).

The inherent limitations of the optical transmitter used in optical link to convert signals from the electrical domain to the optical domain in the uplink path 130 and downlink path 120 can impose significant limitations on the performance of the HFC network 100, both in terms of noise and distortion. The noise and distortion in the optical signal generated by a particular laser module often depends on the density of signals transmitted at a particular moment in time. For example, the noise and distortion of the optical signal in the upstream RF/optical path 130 through a particular optical distribution node 110 depends on the number of subscriber stations (e.g., user premises devices 105) simultaneously transmitting an uplink signal. In other words, when the composite power of the RF input signals used to drive the laser module generating the corresponding optical signals exceeds a threshold level, the optical output signal become clipped, thus diminishing the fidelity and bandwidth of the optical signal. Accordingly, to control the noise and distortion it is necessary to understand the capabilities and characteristics of the laser module. Thus, in addition to BER measurements described above, it is useful to have another concise metric to describe the capabilities of the laser module. One such metric is the noise power ratio measurement.

Noise Power Ratio

Noise-power-ratio (NPR) measurements are commonly used to characterize laser modules. Accordingly, the NPR measurement can be a valuable tool for characterizing optical link performance and capability of laser modules for use in anti-clipping embodiments of the present disclosure. NPR curves provide a quick picture of an optical link's noise and distortion performance with one easy to understand performance curve.

Figure 2:
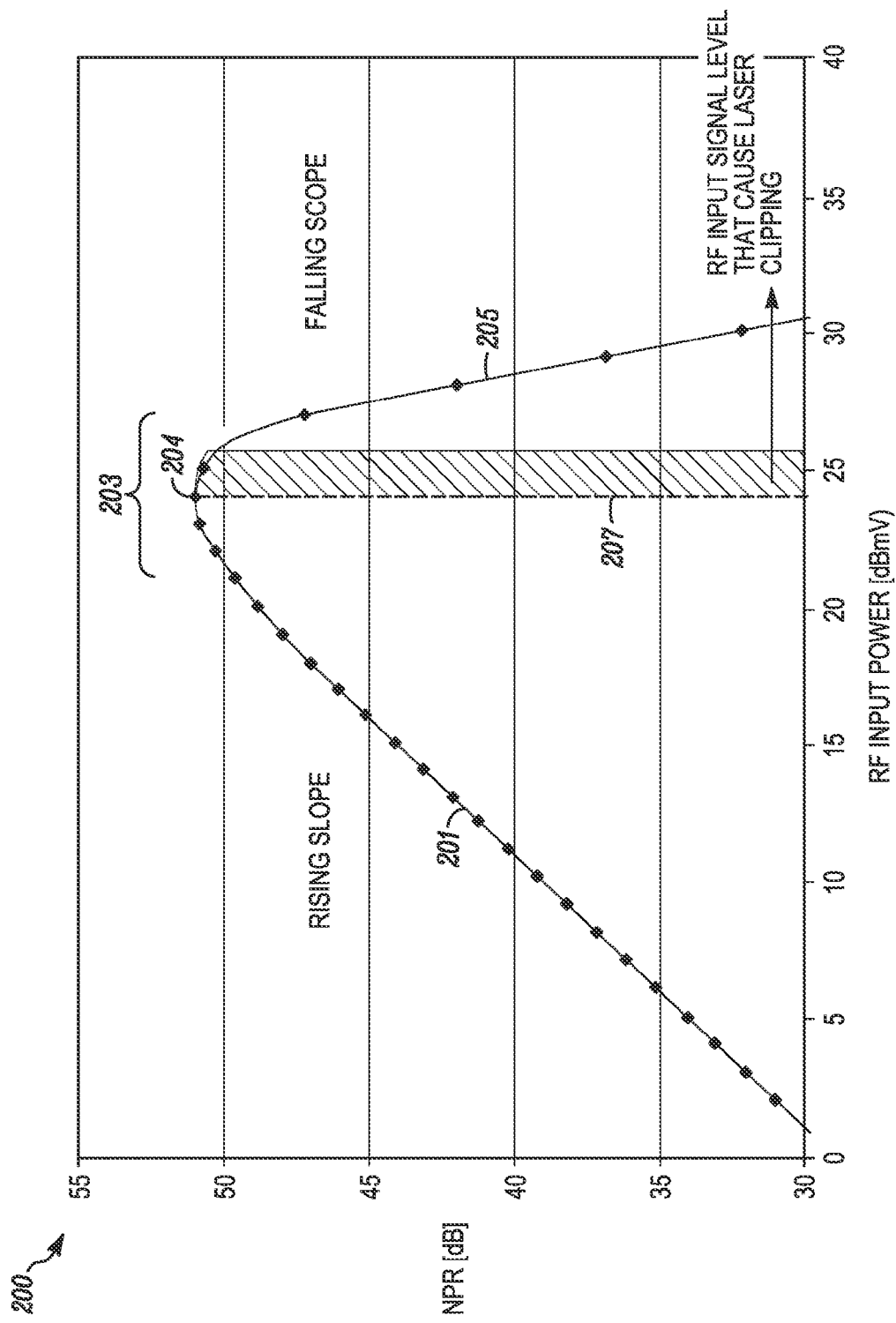
FIG. 2 is an illustrative characteristic noise-power-ratio (NPR) graph for a semiconductor laser module.

NPR measurements include a test method that examines the amount of noise and intermodulation distortion. A test signal, usually including a flat Gaussian noise band limited to the frequency range of interest and within a narrow band (e.g., a channel), is injected into the laser module. The NPR is measured at the output of the laser module as the test signal is swept across a power range. The ratio of the test signal power density to the power density of the combined noise and intermodulation distortion in the channel is determined. An example NPR curve 200 is illustrated in FIG. 2.

In the range of input powers in the rising slope region of the NPR curve 200, the noise is dominated by thermal noise, laser relative noise intensity (RIN), shot noise, and other noise contributors that do not change with signal level. In the noise region 201 on the rising slope, NPR increases approximately 1:1 with an increase in input power. In the range of input powers near peak NPR 204, the noise is dominated by intermodulation noise. The intermodulation region 203 is between the noise region 201 and clipping region 205 on the falling slope of the NPR curve 200. If the distortion performance of the laser module is extremely good, the NPR curve 200 will transition from the noise region 201 to the clipping region 205 with a minimal or no intermodulation region 203. The peak NPR 204 and clipping region 205 are of particular interest for configuring various anti-clipping embodiments of the present disclosure.

Clipping occurs when RF or optical devices are driven into a clipping region 205 in which the input-to-output transfer function is quickly reduced. In the clipping region 205, NPR decreases rapidly with an increase in input power. Thus, to avoid laser clipping in the optical link, embodiments of the present disclosure include systems, circuits, and methods for avoiding the clipping region 205 of the NPR of corresponding laser modules. Related embodiments include operating the optical link at or near peak NPR 204.

Overview

Figure 3:
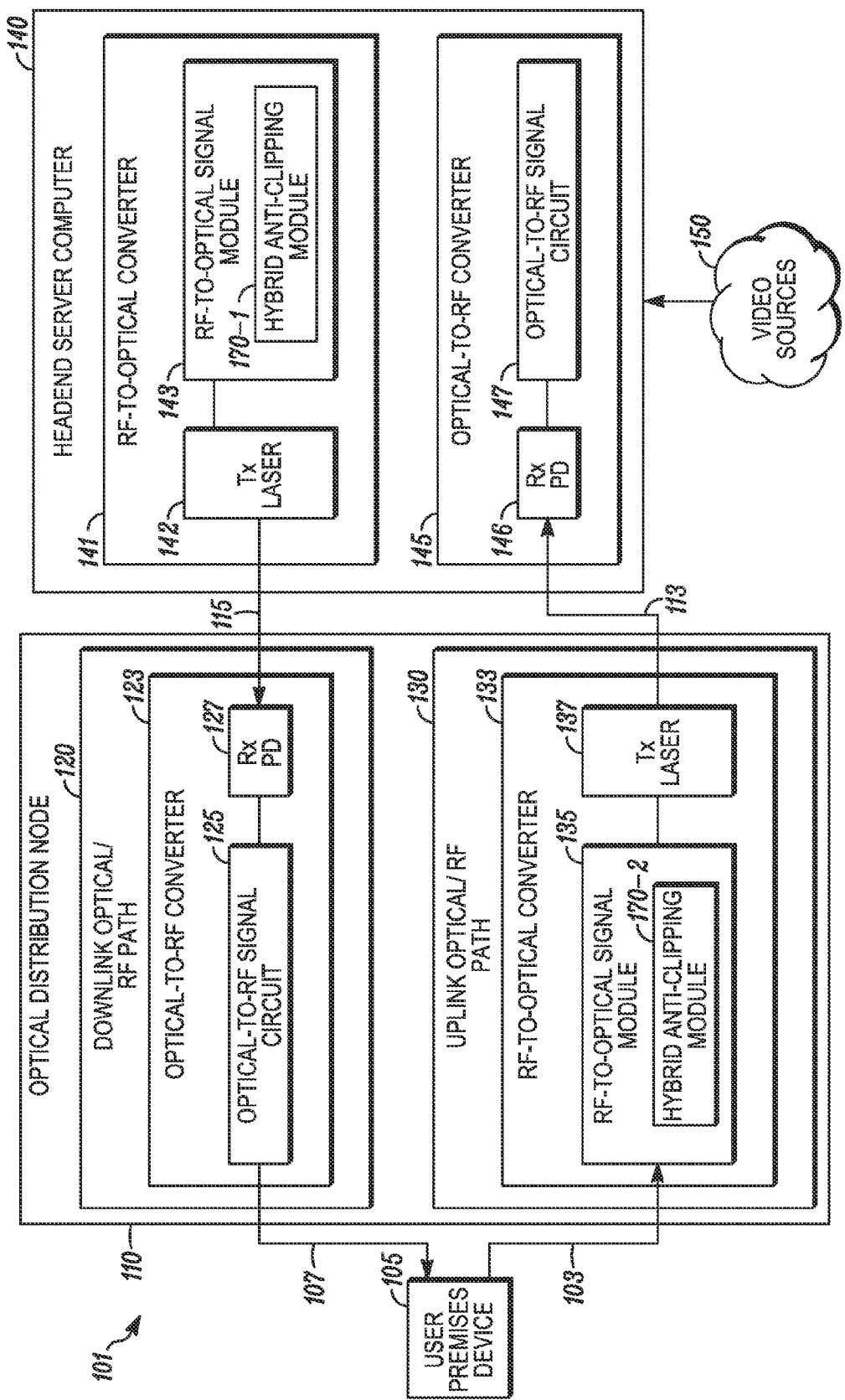
FIG. 3 is a schematic diagram of a HFC network with hybrid anti-clipping modules, according to embodiments of the present disclosure.

Embodiments of the present disclosure include hybrid anti-clipping module in the uplink or downlink optical/RF paths of HFC networks that facilitate the automatic adjustment of the RF input signal powers to avoid operating the optical link in the clipping region 205 of the corresponding NPR curve 200. FIG. 3 illustrates an HFC network 101 with anti-clipping capabilities in the downlink and uplink paths, however, it is possible to include anti-clipping functionality in only one of the uplink path or the downlink path. The overall functionality and flow of signals in HFC network 101 is similar to that of HFC network 100 described above.

As shown in FIG. 3, in the downlink direction, the head-end server computer 140 can generate data signals that the RF-to-optical convertor 141 can transcode into optical signals to be transmitted over optical fiber connection 115 to optical distribution node 110. In one embodiment, the RF-to-optical convertor 141 includes an RF-to-optical signal circuit 143 coupled to a transmitting laser module 142. To avoid operating the transmitting laser module 142 in the clipping region of its corresponding NPR region, the RF-to-optical signal circuit 143 can include a hybrid anti-clipping module 170-1. The downlink optical/RF path 120 in the optical distribution node 110, the optical-to-RF convertor module 123 can include a receiving photo-diode (Rx PD) 127 to receive optical signals transmitted by the transmitting laser 142 and convert them to electrical signals. In such embodiments, the optical-to-RF signal circuit 125 can convert the electrical signal into RF signals and route them to a one or more user premises device 105 over corresponding electrical connections 107 (e.g., coaxial cable).

In the uplink direction, the user premises device 105 can generate and transmit data signals as RF signals over the electrical connection 103 to RF-to-optical convertor 133 in the optical distribution node 110. The RF-to-optical convertor 133 can include an RF-to-optical signal module 135 that generates controls signals to drive the transmitting laser module 137 to transmit optical signals over the optical fiber connection 113 to the optical-to-RF convertor 145 in the head-end server computer 140. To avoid operating the transmitting laser module 137 in the clipping region of its corresponding NPR curve, the RF-to-optical signal module 135 can include a hybrid anti-clipping module 170-2. In the optical-to-RF convertor 145, the receiving photodiode 146 converts the received optical signals to electrical signals. The optical-to-RF signal circuit 147 converts the electrical signals into RF or other signals that the head-end server computer 140 can use.

The use of the hybrid anti-clipping modules 170 in the HFC network 101 improves the input power dynamic range and the quality of the resulting optical signals generated by a particular laser module. Accordingly, higher quality and higher bandwidth two-way communication in an HFC network 101 can be achieved with less complex and lower cost semiconductor laser modules. The various circuits, devices, and methods for hybrid and automatic anti-clipping are discussed in further detail herein.

Hybrid Anti-Clipping Methodology

In one embodiment, anti-clipping techniques include a two prong approach to avoid operating the laser module in the clipping region of its corresponding NPR curve. Such anti-clipping methodology is referred to herein as "hybrid" because it uses parallel automatic gain controls and automatic bias current controls. The gain control is driven by the composite power or RMS power of the RF input signal, while the bias current control is based on the signal envelope peaks exceeding the laser clipping threshold.

In various embodiments, both the RMS power and the envelope of the RF input signal are monitored and used to make independent adjustments to the RF signal attenuation and the laser bias current. Such hybrid anti-clipping techniques can include sampling or splitting off a portion of the RF input signal (e.g., signals generated and transmitted by the user premises device 105) for monitoring purposes. To determine the RMS power and the RF signal power envelope, the portion of the RF input signal can be analyzed by an average power detector and an envelope tracker.

The average power detector can provide a signal that corresponds to the average power of the RF input signal. In embodiments, in which the RF input signal include both positive and negative values, the average power of the RF input signal can be represented by the root mean square (RMS) of the power. Accordingly, the average power of the RF input signal can be represented by an RMS signal (e.g., a current or voltage) that is proportional to the RMS power of the RF input signal. The RMS signal can be used to drive the gain of the RF input signal used to drive the laser module. In one embodiment, the gain can be regulated by a variable attenuator controlled by a microcontroller and a corresponding digital analog converter (DAC) configured or programmed with a laser module-specific lookup table, or other calibration file, that correlates the RMS signal to the actual power of the RF input signal. Based on the RMS signal, the variable attenuator can be configured to attenuate the RF input signal to maintain the RMS power in a region of the NPR curve at or below the NPR peak for the specific laser module.

The envelope detector can track the instantaneous power of the RF input signal and generate a corresponding output signal. The output signal of the envelope detector can be used as a trigger signal to generate an anti-clipping voltage or as the actual anti-clipping voltage used to drive a laser bias control circuit that increases the laser bias current proportionally to the envelope peaks exceeding a specified RF power threshold to avoid laser clipping.

In one embodiment, the outputs of the average power detector and the envelope detector can be synchronized to dynamically configure a conditioning circuit to generate an anti-clipping voltage based on the level of attenuation provided by the variable attenuator at that time. Accordingly, the anti-clipping voltage is triggered only for those RF input signal envelope peaks that exceed the specified RF input power level, also referred to herein as the "clipping threshold," for a specific level of attenuation. The maximum anti-clipping voltage can also be configured by the microcontroller which drives a limiter circuit to avoid overdriving the laser module.

Embodiments are highly configurable because the RF input signal power attenuation and the anti-clipping voltage used to bias the laser module can be dynamically configured using a lookup table in the microcontroller for specific RMS power levels of the RF input signal versus attenuation levels. The microcontroller can provide the required signals for operating an anti-clipping conditioning circuit to limit the anti-clipping voltage for specific power levels above the clipping threshold when the RF input signal is attenuated at certain levels. The anti-clipping voltage limiting functionality can be implemented using a clamp circuit. The instantaneous clipping thresholds in the clamp circuit can be correlated to the gain/attenuation.

The anti-clipping voltage can be configured to operate as envelope follower or to increase proportionally to envelope peaks detected above the clipping threshold. The increase in the anti-clipping voltage can be held for a configurable period of time before decreasing gradually. Such functionality can be implemented using a fast comparator and a sample and hold circuit. The fast comparator can used to detect clipping events and provide notifications to the microcontroller. The microcontroller can use notifications to provide a control signal to the sample and hold circuit to hold the anti-clipping voltage for a configurable period of time. In such embodiments, the bias current incursions can be significantly reduced.

The anti-clipping voltage can also be configured to increase or decrease the anti-clipping voltage gain. In this way, the anti-clipping voltage can be configured to increase the amplitude of the laser bias current proportionally to the clipping events to avoid laser clipping or it can be increased with an additional offset to allow for a margin of error. The anti-clipping gain offset configurability is useful when using the sample and hold approach to reduce further the probability of laser clipping.

Finally, the anti-clipping voltage can also be configured to limit the maximum anti-clipping voltage or laser bias current increase in order to avoid overdriving the laser module. This maximum anti-clipping voltage can be determined based on the characteristics of the specific laser module in the optical link and the nominal optical output power with which it is configured to operate.

Hybrid Anti-Clipping Module

Figure 4A:
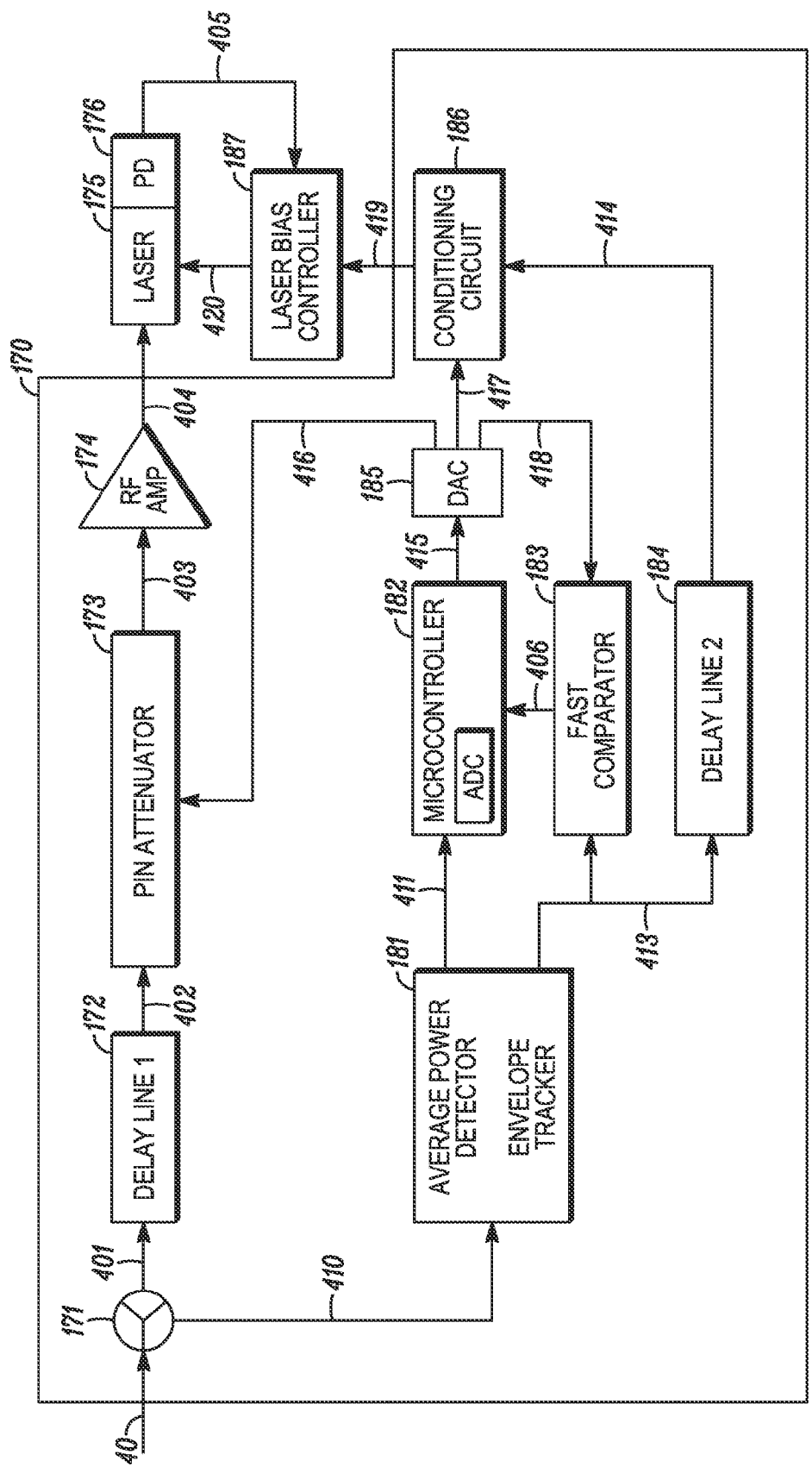
FIG. 4A is a schematic diagram of a hybrid anti-clipping module, according to embodiments of the present disclosure.

FIG. 4A depicts an example hybrid anti-clipping circuit 170 and an associated signal flow, according to embodiments of the present disclosure. As depicted in FIG. 3, the anti-clipping circuit 170 can be implemented as one or more modules in either the uplink or down link paths.

For the sake of clarity, the embodiments described in reference to FIG. 4A refer to the RF input signal 40. One of ordinary skill in the art will recognize that the RF input signal 40 can originate from the user premises device 105 or the head-end server computer 140 and can include any electronic communication data or protocol.

In various embodiments, the hybrid anti-clipping circuit 170 can receive the RF input signal 40. In one embodiment, a coupler 171 can split the RF input signal 40. In the example shown, the coupler 171 splits RF input signal 40 into a main RF input signal 401 and a coupled RF input signal 410. The power of main RF input signal 401 and the coupled RF input signal 410 can be equal or different to one another. In one embodiment, the coupled RF input signal 410 can be a portion of the RF input signal 40. Accordingly, the sum of the main RF input signal 401, the coupled RF input signal 410, and the corresponding coupling loss due to the characteristics of the coupler 171 is equal to the RF input signal 40. Hence, the coupled RF input signal 410 is equal to the RF input signal 40 received by the coupler 171 minus the coupling loss and main RF input signal 401.

The coupled RF input signal 410 can be fed into an average power detector and envelope tracker 181. In one embodiment, the average power detector and envelope tracker 181 can be implemented as an integrated circuit that includes an RF envelope tracker circuit and a true power RMS detector circuit. In other embodiments, the average power detector and envelope tracker 181 can be implemented as separate devices or circuits.

The average power detector and envelope tracker 181 can generate an envelope amplitude signal (e.g., a voltage) 413 that is proportional to the envelope of the RF input signal 40. The average power detector and envelope tracker 181 can also generate an RMS signal 411 that corresponds to the average input power of the RF input signal 40. In some embodiments, the RMS signal 411 is independent of the peak-to-average ratio of the RF input signal 40. A more detailed description of the RMS signal 411 and the envelope amplitude signal 413, and how they are compared to the input power clipping threshold of a particular laser module, are described in more detail in reference to FIG. 5.

In one embodiment, the RMS signal 411 can be received by the microcontroller 182. Embodiments in which the microcontroller 182 operates in digital signals, it can include an analog-to-digital converter (ADC). Accordingly, the analog signals (e.g., voltages) received from the average power detector and envelope tracker 181 can be converted to a digital signal before the microcontroller 182 processes the signals.

The microcontroller 182 can include a configurable lookup table that correlates the RMS signal 411 to the RMS input power of the RF input signal 40 based on specifications or measurements of the coupler 171 and/or the average power detector and envelope tracker 181. Accordingly, the microcontroller 182 can reference the lookup table to determine the RMS input power of the RF input signal 40 based on the RMS signal 411.

The microcontroller 182 can also include another lookup table in which the clipping threshold of the laser 175 is programmed in the microcontroller. In one embodiment, the clipping threshold is stored as an RMS power level limit of the RF input signal 40 with a particular range of values. In another embodiment, the clipping threshold can be stored as a discrete power level. In either such embodiments, the clipping threshold can correspond to an input power that causes the laser 175 to operate at or near the peak of its NPR curve. In some embodiments, the clipping threshold is associated with a specific combination of laser 175 and amplifier 174.

The clipping threshold can correspond to an input power of the RF input signal 40 that results in laser clipping when variable PIN attenuator 173 is configured to pass the main RF input signal 401 without attenuation (e.g., attenuation equals 0 dB loss). As described herein, the clipping threshold depends on the characteristics of the specific laser 175, the nominal laser bias current, and the gain of the RF amplifier 174. Since the laser 175 and the RF amplifier 174 are often implemented as a single device, the combination is often referred to herein as a laser module. However, in some embodiments, the RF amplifier 174 and laser 175 can be implemented in different modules. Accordingly, the clipping threshold can be associated with a particular laser module or a combination of components that operated in together at a corresponding nominal bias current. In general, the clipping threshold can be illustrated graphically in an NPR curve similar to that illustrated in FIG. 2. For example, the clipping threshold can be defined as the input power of the RF input signal 40 at which the NPR curve transitions to a falling slope from the peak NPR value. In particular, the clipping threshold can be defined as the input power at which the level of non-linear distortion caused by signal clipping at the laser is higher than the laser link noise.

In one embodiment, the microcontroller 182 can determine the RMS input power of the RF input signal 40 and/or the main RF input signal by referencing the lookup table based on the RMS signal 411. The microcontroller 182 can then compare the RMS input power of the RF input signal 40 and/or main RF input signal 401 with the clipping threshold. In some embodiments, to synchronize the main RF signal 401 with the control signals generated by the microcontroller 182, the hybrid anti-clipping circuit 170 can include a delay line module 172 that delays the main RF signal 401 by a time corresponding to the time it takes to process the coupled RF signal 410. Accordingly, the delay line module 172 outputs a delayed main RF signal 402 for synchronizing with control signal 416.

Based on the RMS signal 411, the microcontroller 182 can generate and provide corresponding digital control signals 415 to the DAC 185. In such embodiments, the DAC 185 can convert the digital control signals 415 from a digital domain to an analog domain usable by other analog components in the hybrid anti-clipping circuit 170.

For example, when the RMS input signal 411 indicates that the RMS input power of either the RF input signal 40 or the main RF input signal 401 is below the clipping threshold, the microcontroller 182 and the DAC 185 can provide an analog attenuator control voltage 416, according to a lookup table associated with the PIN attenuator 173, that results in no attenuation. In one embodiment, the analog attenuator control voltage 416 can include a nominal operating voltage at which the PIN attenuator 173 is configured for 0 dB attenuation (e.g., no gain or attenuation). As the RMS signal 411 changes to indicate changes in the RMS power, the microcontroller 182 and the DAC 185 can change the analog attenuator control voltage 416 to change the attenuation level of the PIN attenuator 173 to maintain the RMS power of the delayed main RF input signal 402 to be at, near, or below the clipping threshold.

For example, if the RMS signal 411 indicates that the RMS power is above the clipping threshold, the microcontroller 182 can generate a digital control signal 415 that configures the PIN attenuator 173 to attenuate the delayed RF input signal 402 enough so that the RMS power of the resulting attenuated RF input signal 403 is less than the clipping threshold, thus maintaining peak NPR for the RF amplifier 174 and laser 175 combination. Accordingly, the level of attenuation can be proportional to the degree to which the RMS power of the main RF input signal 401 is determined to be above the clipping threshold. However, in one embodiment, the level of attenuation may be fixed. In another embodiment, the level attenuation may be selected from one of number of predetermined discrete levels of attenuation.

Since the RMS power of the RF input signal 40 can vary overtime, if the RMS signal 411 indicates that the RMS power decreases to be closer to or less than the clipping threshold, then the microcontroller 182 can generate a digital control signal 415 that causes the PIN attenuator 173 to reduce or eliminate the level of attenuation applied to the delayed main RF input signal 402.

The control signals 415 generated by the microcontroller 182 can also include a serial peripheral interface (SPI) signal that causes the DAC 185 to generate the control signals 417 (e.g., control voltages) for controlling the conditioning circuit 186. Control signals 417 and conditioning circuit 186 are described in more detail below in reference to FIG. 4B.

As described herein, the average power detector and envelope tracker 181 can generate envelope amplitude signal 413 that is proportional to the instantaneous power envelope of the RF input signal 40. In one embodiment, envelope amplitude signal 413 can be delayed by delay line module 184 by a time that is calculated to provide adequate time delay to synchronize the anti-clipping signal 419 (e.g., anti-clipping voltage that controls the laser bias) with the envelope power peaks exceeding the instantaneous clipping threshold. The conditioning circuit 186 can generate anti-clipping signal 419 based on the delayed envelope amplitude signal 414 and the control signals 417 to adjust the laser bias current.

In one embodiment, the control signals 417 and the delayed envelope amplitude signal 414 can be used by the conditioning circuit 186 to set the anti-clipping offset signal 419 that the laser bias controller 187 can use to set the laser bias signal 420 (e.g., a laser bias current) to avoid overdriving the laser module.

In some embodiments, the conditioning circuit 186 generates an anti-clipping offset signal 419 that is proportional to the analog attenuator control voltage 416. For example, if the attenuator control voltage 416 causes the attenuation level of the PIN attenuator 173 to increase, the anti-clipping offset signal 419 can also increase to set an instantaneous clipping threshold. When the PIN attenuator 173 increases attenuation, then the instantaneous clipping threshold controlled by offset voltage 417-1 increases. Accordingly, the trigger level changes for the generation of the anti-clipping offset signal 419. This lowers the probability that the trigger anti-clipping offset signal 419 will decrease. In contrast, when the PIN attenuator 173 decreases attenuation, then the instantaneous clipping threshold controlled by offset voltage 417-1 decreases. It changes the trigger level for the generation of the anti-clipping offset signal 419. This lowers the probability that the trigger anti-clipping offset signal 419 will increase. Accordingly, the instantaneous clipping threshold can change dynamically based on the configuration of the PIN attenuator 173.

As described herein, the laser 175 can be biased by the laser bias signal 420 to generate or maintain a particular optical output. In such embodiments, the laser bias signal 420 is configured by the laser bias controller 187 to achieve a specific optical output power. In one embodiment, the laser bias signal 420 can be controlled dynamically based on the feedback signal 405 produced by the photo detector 176. The feedback signal 405 can be used by the laser bias controller to correct the laser bias signal 420 for changes produced by the characteristic degradation of the laser caused by temperature fluctuations or aging.

In various embodiments, the conditioning circuit 186 can generate anti-clipping offset signal 419 to control the laser bias controller 187 to produce laser bias current increases synchronized (using the delay lines 1 and 2) with the envelope peaks in the envelope amplitude signal 413 that exceed the instantaneous clipping threshold. Accordingly, the laser bias controller 187 can generate the laser bias signal 420 that is the sum of the nominal bias current determined to maintain a specific optical output power and the anti-clipping bias current driven by the anti-clipping offset signal 419.

Conditioning Circuit

Figure 4B:
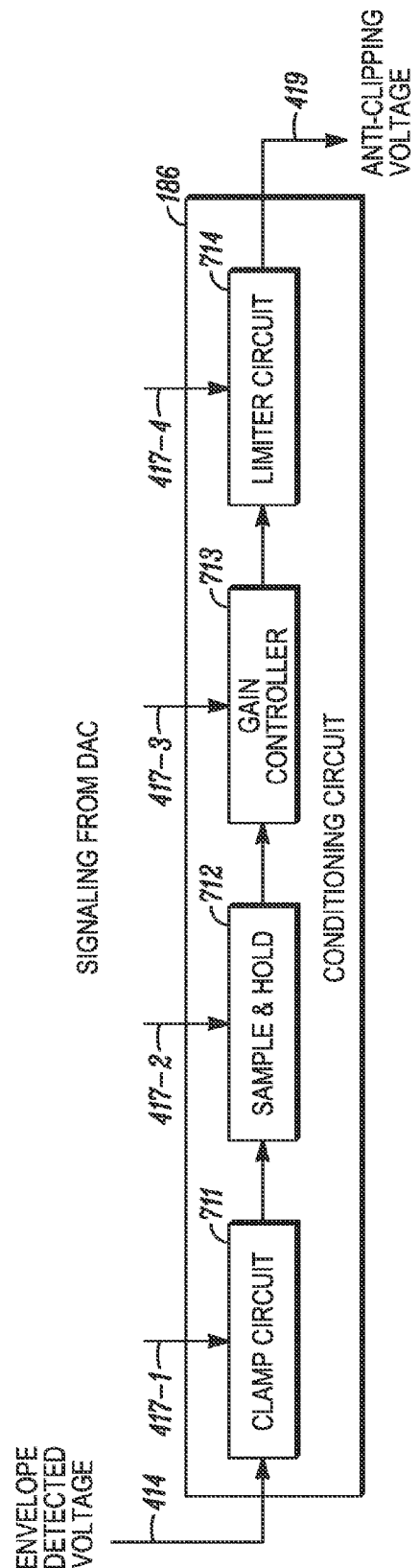
FIG. 4B is a schematic diagram of a conditioning circuit of a hybrid anti-clipping module, according to embodiments of the present disclosure.

In embodiments, the conditioning circuit 186 can include various components for generating the anti-clipping offset signal 419 that controls the laser bias controller 187. Accordingly, control signals 417 generated by the microcontroller 182 through DAC 185 may also include constituent signals for controlling the various components of the conditioning circuit 186. FIG. 4B illustrates components of the conditioning circuit 186 and the various control signals 417 used to control them, according one embodiment of the present disclosure. In the example shown, the conditioning circuit 186 can include clamp circuit 711, sample and hold circuit 712, gain controller circuit 713, and limiter circuit 714. In corresponding embodiments, the control signals 417 can include offset voltage 417-1, follow and hold voltage 417-2, gain voltage 417-3, and laser limiting voltage 417-4.

In one embodiment, the clamp circuit 711 can receive and use the offset voltage 417-1 to set the offset voltage while the conditioning circuit 186 is processes the delayed envelope amplitude signal 414. The offset voltage 417-1 can be proportional to the level of attenuation achieved by the PIN attenuator 173 in accordance with the analog attenuator control voltage 416. The offset voltage 417-1 can change dynamically based on the configuration of PIN attenuator 173 and can trigger the generation of the anti-clipping offset signal 419 for specific conditions.

In embodiments, the follow and hold voltage 417-2 configures the sample and hold circuit 712 to operate as an envelope follower. In such embodiments, the anti-clipping offset signal 419 follows the peaks of the delayed envelope amplitude signal 414. In other embodiments, the follow and hold voltage 417-2 can configure the sample and hold circuit 712 to cause the anti-clipping offset signal 419 to increase proportionally to the envelope peak detected and then hold at the increased level for a configurable period of time before decreasing gradually over a defined period. In one embodiment, the sample and hold functionality is achieved using signals from the fast comparator 183 and a sample and hold circuit 712.

In such embodiments, the fast comparator 183 compares envelope amplitude signal 413 to the instantaneous clipping threshold 418, which is analogous to offset voltage 417-1, to detect clipping events and to trigger the microcontroller 182 with the ON/OFF signal 406. In response to the ON/OFF signal 406, microcontroller 182 can send the follow and hold voltage 417-2 to the sample and hold circuit 712 to hold the anti-clipping voltage 420 for a configurable period of time. In this way, the bias current incursions due to the anti-clipping circuitry are reduced significantly when several clipping events are detected in a short period of time.

In embodiments, the microcontroller 182 can generate gain voltage 417-3 to configure the gain controller circuit 713 to change the gain on anti-clipping voltage 419. Accordingly, the conditioning circuit 186 can be configured to generate an anti-clipping voltage 419 that causes the laser bias controller 187 to increase the bias current amplitude proportionally to the clipping events to avoid laser clipping. In other embodiments, the anti-clipping voltage 419 can be increased with additional amplitude offset to allow for a greater margin, thus reducing the probability that laser module 175 will clip the optical signals.

In one embodiment, the microcontroller 182 can generate laser limiting voltage 417-4 to configure the limiter circuit 714 to limit the maximum anti-clipping voltage 419 and/or the resulting laser bias current 420 to avoid overdriving the laser 175. The laser limiting voltage 417-4 can be determined based on the characteristics of the specific laser 175 and the nominal optical output power and stored in a lookup table in the microcontroller 182 or an associated non-volatile memory.

The difference between the RMS signal 411 and the RMS clipping threshold programmed in the microcontroller 182 can be used to generate the attenuator control voltage 416 to configure the PIN attenuator 173. In parallel, the PIN attenuator 173 configuration can determine the instantaneous clipping threshold 418 and offset voltage 417-1 which define an instantaneous clipping threshold 418. The conditioning circuit 186 can compare the instantaneous clipping threshold 418 to the delayed envelope amplitude signal 414 to generate the anti-clipping voltage 419.

In some embodiments, the anti-clipping circuit 186 can be disconnected from the laser 175 during periods of time in which no clipping events are detected (e.g., when the RMS signal 411 and the envelope amplitude signal 413 are below the RMS and instantaneous clipping thresholds).

RF Input Signal Average Power and Envelope Amplitude

Figure 5:
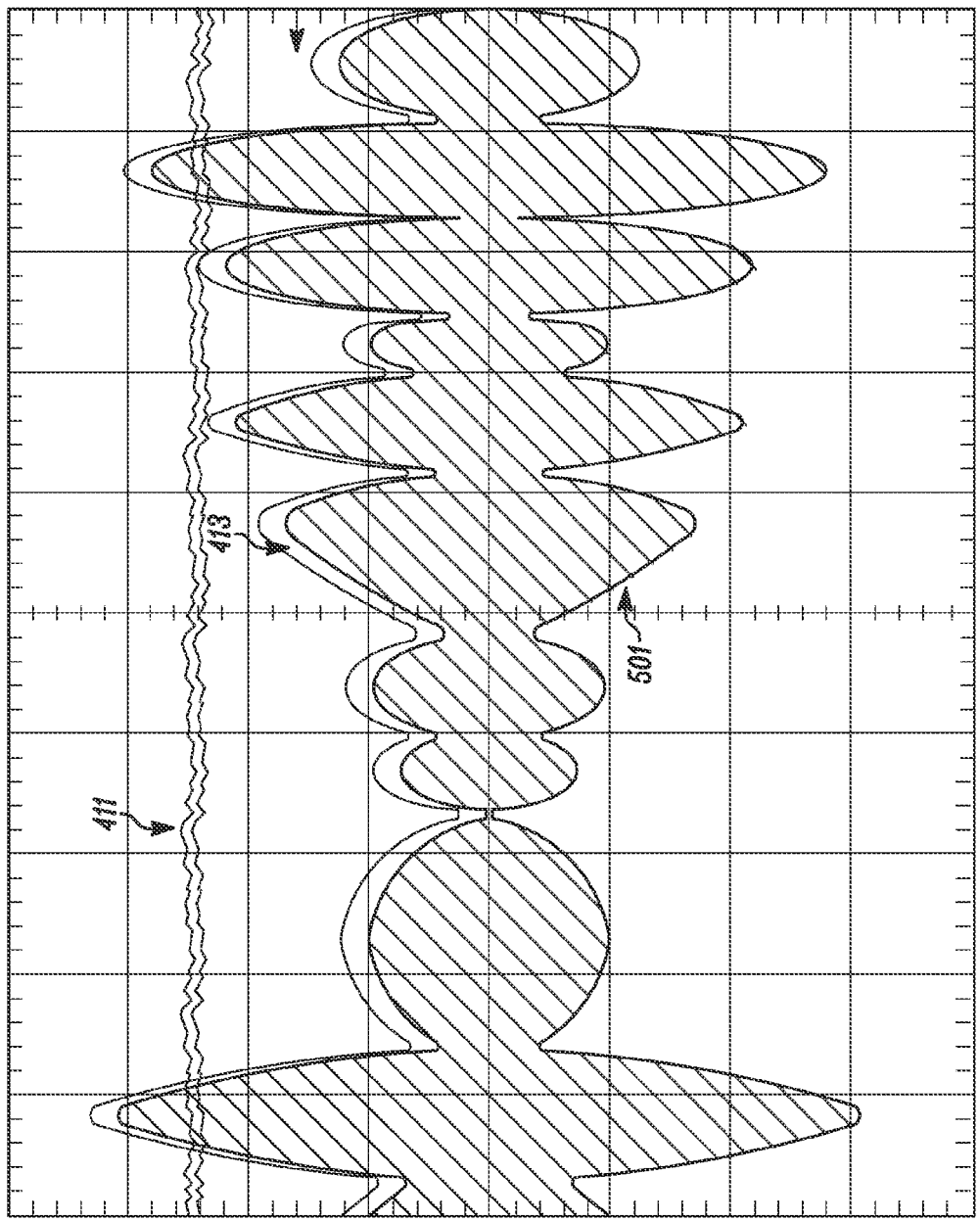
FIG. 5 illustrates an RF input signal power profile with characteristic average power and power envelope peaks.

FIG. 5 illustrates characteristics of an RF input signal 40 of particular interest in embodiments of the present invention. In particular, FIG. 5 illustrates a graph 500 of a power profile 501 of an RF input signal 40 and the corresponding outputs of the average power detector and envelope tracker 181. As shown, the average power detector and envelope tracker 181 can determine the RMS signal 411 and envelope amplitude signal 413. Various embodiments of the present disclosure involve altering the RMS power corresponding to RMS signal 411 and laser bias corresponding to envelope amplitude signal 413, alone and in combination, to avoid operating a laser module above its clipping threshold to improve input signal power dynamic range and optical signal fidelity.

In embodiments, the RMS power of the RF input signal 40 is represented by the RMS signal 411. The amplitude of the power envelope of the RF input signal 40 is represented by the envelope amplitude signal 413. Accordingly, embodiments of the present disclosure can analyze the RMS power level and power envelope amplitude by analyzing the RMS signal 411, envelope amplitude signal 413, and a corresponding lookup table or configuration file. In one embodiment, the hybrid anti-clipping circuit 170 can operate in one of four modes in response to the RMS signal 411 and/or the envelope amplitude signal 413 of a particular input signal 40 being continuously or instantaneously greater that the clipping threshold of the laser module of interest.

Modes of Operation

Figure 6:
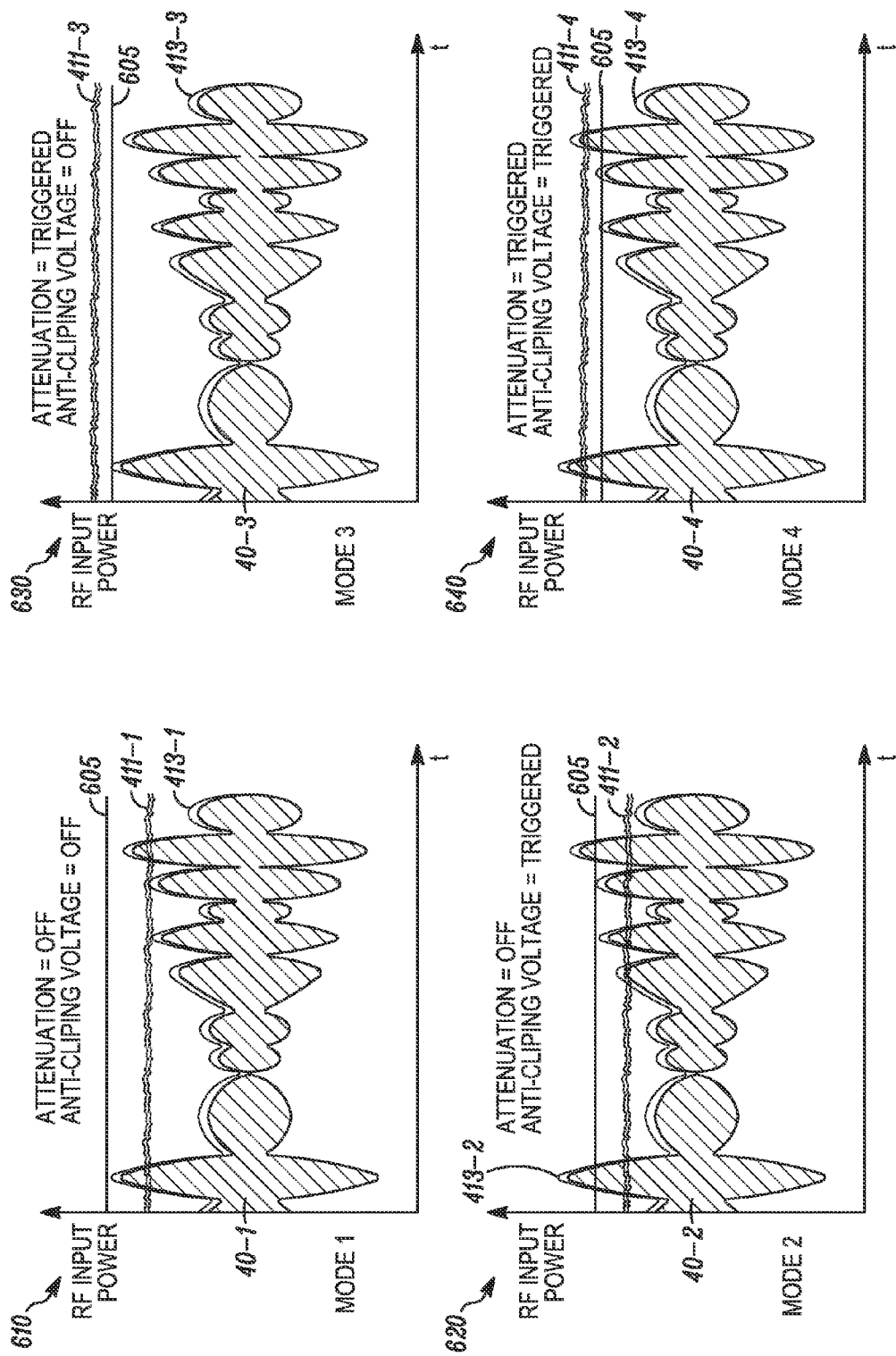
FIG. 6 illustrates RF input signal power profiles and the resulting modes of operation of a hybrid anti-clipping module, according to embodiments of the present disclosure.

FIG. 6 illustrates four example RF input signal scenarios and the corresponding modes of operation of anti-clipping circuit 170. In the particular examples illustrated, the laser module of interest has a clipping threshold represented by level 605. In each scenario, the anti-clipping circuit 170 can receive RF input signals 40, represented here by the power profiles. The anti-clipping circuit 170 can analyze the RF input signals to generate the corresponding RMS signal 411 and power envelope amplitude signal 413. The RMS signals 411 and power envelope amplitude signal 413 can then be compared against the clipping threshold 605. Based on the comparisons, the anti-clipping circuit 170 can enter into one of four modes of operation. These modes of operation are summarized in Table 1 and discussed in more detail below.

TABLE 1

RMS power and envelope peak level conditions and corresponding operational modes.

| Mode | PIN Atten. | Anti-clipping | Description |
| --- | --- | --- | --- |
| 1 (Scenario 610) | OFF | OFF | RMS power level ≤ clipping threshold<br>Envelope peaks ≤ clipping threshold |
| 2 (Scenario 620) | OFF | ON | RMS power level ≤ clipping threshold<br>Envelope peaks > clipping threshold |
| 3 (Scenario 630) | ON | OFF | RMS power level > clipping threshold<br>Envelope peaks ≤ clipping threshold |
| 4 (Scenario 640) | ON | ON | RMS power level > clipping threshold<br>Envelope peaks > clipping threshold |

In scenario 610, both the RMS power level and the power envelope amplitude indicated by the RMS signal 411-1 and power envelope amplitude signal 413-1 are lower that the clipping threshold 605 of the laser module. Accordingly, the anti-clipping circuit 170 can operate in a mode in which it applies no attenuation to the RF input signal and also does not apply an anti-clipping signal 419 to the laser module (e.g., Mode 1: attenuation off and anti-clipping bias off).

In scenario 620, the RMS power level indicated by the RMS signal 411-2 is lower that the clipping threshold 605, but the power envelope amplitude indicated by the power envelope amplitude signals 413-2 has peaks that are above the clipping threshold 605 of the laser module. In such scenarios, the anti-clipping circuit 170 will apply no attenuations, but will apply an anti-clipping signal to temporarily increase the clipping threshold of the laser module (e.g., Mode 2: attenuation off and anti-clipping bias on). In one embodiment, the anti-clipping signal will be applied for the same amount of time for which a peak of the power envelope amplitude signal 413-2 indicates that the power envelope amplitude is greater than the original clipping threshold 605. In other embodiments, the anti-clipping signal can be applied for a predetermined or dynamically determined duration after the peak of the power envelope amplitude signal 413-2 is above the clipping threshold.

In scenario 630, while the peaks of the power envelope amplitude signal 413-3 indicates that the power envelope amplitude remains below the clipping threshold 605, the RMS signal 411-3 indicates that the RMS power level is above the clipping threshold 605. In such scenarios, the anti-clipping circuit 170 does not apply the anti-clipping signal to the laser module, but it does attenuate the RF input signal sufficiently to reduce the RMS power level so that it is reduced to a level below the clipping threshold (e.g., Mode 3: attenuation on and anti-clipping bias off).

In scenario 640, peaks in the power envelope amplitude signal 413-4 and the RMS signal 411-4 indicate that the power envelope amplitude and RMS power level are above the clipping threshold 605. In such scenarios, the anti-clipping circuit 170 can apply a corresponding level of attenuation to the RF input signal and apply the anti-clipping signal to the laser module (e.g., Mode 4: with attenuation on and anti-clipping bias off).

Particular embodiments may be implemented in a non-transitory computer-readable storage medium for use by or in connection with the instruction execution system, apparatus, system, or machine. The computer-readable storage medium contains instructions for controlling a microcontroller or computer system to perform a method described by particular embodiments. The microcontroller or computer system may include one or more computing devices. The instructions, when executed by one or more computer processors or microcontrollers, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A device for generating an optical communication signal comprising:
   a coupler that splits an input signal into a first signal and a second signal;
   an envelope tracker that generates an envelope tracking signal proportional to a time varying power envelope of the first signal;
   an average power detector that generates an average power signal corresponding to an average power of the first signal;
   a microcontroller to generate a plurality of control signals based on the envelope tracking signal and the average power signal;
   a variable attenuator coupled to the coupler to generate an attenuated signal corresponding to the second signal in response to a first control signal in the plurality of the control signals;
   a laser bias controller that generates a laser bias current in response to a second control signal in the plurality of the control signals; and
   a laser module coupled to the variable attenuator and the laser bias controller that generates the optical communication signal corresponding to the input signal and in response to the attenuated signal and the laser bias current.

2. The device of claim 1, wherein:
   the average power signal comprises an average power voltage,
   the microcontroller is programmed with a clipping threshold voltage corresponding to an input power threshold of the laser module, and
   the microcontroller compares the average power voltage to the clipping threshold voltage to generate the control signals.

3. The device of claim 1, wherein:
   the envelope tracking signal comprises an envelope tracking voltage,
   the microcontroller is programmed with a clipping threshold voltage corresponding to an input power threshold of the laser module, and
   the microcontroller compares the envelope tracking voltage to the clipping threshold voltage to generate the control signals.

4. The device of claim 1, wherein the attenuated signal is the same as the second signal.

5. The device of claim 1, wherein the laser bias current comprises a nominal laser bias current and a laser bias current offset, and wherein the laser bias current offset is proportional to a degree to which peaks in the envelope tracking signal exceed a predetermined threshold.

6. The device of claim 1, wherein the envelope tracker and the average power detector are implemented in a single integrated circuit device.

7. The device of claim 1, wherein the laser module comprises a laser diode and an amplifier.

8. An anti-clipping circuit comprising:
   an envelope tracker configured to generate an envelope tracking signal proportional to a time varying power envelope of an input signal;
   an average power detector configured to generate an average power signal corresponding to an average power of the input signal;
   a microcontroller configured to generate a plurality of control signals based on the envelope tracking signal, the average power signal, and a clipping threshold of a laser module;
   a variable attenuator configured to generate an attenuated signal corresponding to the input signal in response to a first control signal in the plurality of the control signals to drive the laser module; and
   a conditioning circuit configured to generate a bias control voltage based on one or more control signals in the plurality of control signals to bias the laser module.

9. The anti-clipping circuit of claim 8, wherein the microcontroller dynamically determines the clipping threshold of the laser module in response to a comparison of at least one of the plurality of control signals and the envelope tracking signal.

10. The anti-clipping circuit of claim 8, wherein to generate the plurality of control signals, the microcontroller compares the average power signal to the clipping threshold.

11. The anti-clipping circuit of claim 8, wherein to generate the plurality of control signals, the microcontroller compares the envelope tracking signal to the clipping threshold.

12. The anti-clipping circuit of claim 8, wherein first control signal causes the variable attenuator to apply no attenuation to the input signal to generate the attenuated signal that is the same as the input signal.

13. The anti-clipping circuit of claim 8, wherein the one or more control signals causes the conditioning circuit to generate the bias control voltage at a nominal bias control voltage associated with the laser module.

14. The anti-clipping circuit of claim 8, wherein the conditioning circuit generates the bias control voltage for a duration corresponding to a time during which a peak in the envelope tracking signal is greater than the clipping threshold.

15. The anti-clipping circuit of claim 14, wherein the duration is extended by a default period of time.

16. The anti-clipping circuit of claim 8 wherein the envelope tracker and the average power detector are implemented in a single integrated circuit device.

17. A method for operating an optical link comprising:
receiving an input signal;
analyzing the input signal to generate an average power signal and an envelope tracking signal;
determining a clipping threshold for a particular laser module in the optical link;
comparing the average power signal to the clipping threshold to generate a first control signal;
comparing the envelope tracking signal to the clipping threshold to generate a second control signal;
attenuating the input signal in accordance with the first control signal to generate an attenuated input signal;
generating a laser bias signal in accordance with the second control signal; and
operating the laser module with the attenuated input signal and the laser bias signal to generate an optical signal.

18. The method of claim 17, wherein a difference between the attenuated input signal and the input signal is proportional to a difference between the average power signal and the clipping threshold.

19. The method of claim 17, wherein the laser bias signal is proportional to a degree to which a peak in the envelope tracking signal exceeds the clipping threshold.

20. The method of claim 19, wherein the generating the laser bias signal comprises generating the laser bias signal for a duration corresponding to a time during which the peak in the envelope tracking signal exceeds the clipping threshold.

* * * * *